United States Patent [19]

Roof

[11] Patent Number: 5,552,060
[45] Date of Patent: Sep. 3, 1996

[54] ABATEMENT OF HYDROGEN SULFIDE WITH EPOXIDES

[75] Inventor: Glenn L. Roof, Sugar Land, Tex.

[73] Assignee: Baker Hughes Incorporated, Houston, Tex.

[21] Appl. No.: 435,624

[22] Filed: May 5, 1995

[51] Int. Cl.$^6$ ...................................................... C02F 1/58
[52] U.S. Cl. ......................... 210/749; 208/189; 208/237; 208/240
[58] Field of Search ............................... 208/189, 237, 208/240; 210/749

[56] References Cited

U.S. PATENT DOCUMENTS 2,530,561  11/1950  Arnold et al. ........................... 208/240
3,565,793  2/1971  Herbstman et al. ..................... 208/240

OTHER PUBLICATIONS

44th Annual Laurance Reid Gas Conditioning Conference Proceedings, presented by Engineering Geosciences, The College of Continuing Education, The University of Oklahoma, Feb. 27 –Mar. 2, 1994.

Abstract No. 164016a, Chemical Abstracts, vol. 77, 1972.

Abstract No. 16810k, Chemical Abstracts, vol. 78, 1973.

Abstract No. 29347q, Chemical Abstracts, vol. 78, 1973, 469.

Abstract No. 59439e, Chemical Abstracts, vol. 80, 1974.

Abstract No. 107974z, Chemical Abstracts, vol. 80, 1974.

Abstract No. 105:45235h, Chemical Abstracts, vol. 105, 1986, 130.

*Primary Examiner*—Neil McCarthy
*Attorney, Agent, or Firm*—Rosenblatt & Redano P.C.

[57] ABSTRACT

The present invention provides a method for scavenging $H_2S$ from aqueous and hydrocarbon substrates using an epoxide. Preferred epoxides are styrene oxide, 1,3-butadiene diepoxide, and cyclohexene oxide.

22 Claims, No Drawings

ABATEMENT OF HYDROGEN SULFIDE WITH EPOXIDES

FIELD OF THE INVENTION

The invention relates to chemical compositions and methods for scavenging hydrogen sulfide ($H_2S$) from "sour" aqueous and hydrocarbon substrates. More particularly, the invention relates to the use of epoxides as scavengers for sulfhydryl compounds, preferred epoxides being styrene oxide, 1,3-butadiene diepoxide, and cyclohexene oxide.

BACKGROUND OF THE INVENTION

The removal of $H_2S$ from a liquid or gaseous hydrocarbon stream is a problem that has challenged many workers in many industries. One such industry is the petroleum industry, where the $H_2S$ content of certain crudes from reservoirs in many areas of the world is too high for commercial acceptance. The same is true of many natural gas streams. Even where a crude or gas stream contains only a minor amount of sulfur, the processes to which the crude oil or fractions thereof are subjected often produce one or more hydrocarbon stream that contains $H_2S$.

The presence of $H_2S$ in hydrocarbon streams presents many environmental and safety hazards. Hydrogen sulfide is highly flammable, toxic when inhaled, and strongly irritates the eyes and other mucous membranes. In addition, sulfur-containing salts can deposit in and plug or corrode transmission pipes, valves, regulators, and the like. Flaring of natural gas that contains $H_2S$ does not solve the problem for gas streams because, unless the $H_2S$ is removed prior to flaring, the combustion products will contain unacceptable amounts of pollutants, such as sulfur dioxide ($SO_2$)—a component of "acid rain."

Hydrogen sulfide has an offensive odor, and natural gas containing $H_2S$ often is called "sour" gas. Treatments to reduce or remove $H_2S$ from hydrocarbon or other substrates often are called "sweetening" treatments. The agent that is used to remove or reduce $H_2S$ levels sometimes is called a "scavenging" agent. The sweetening or scavenging of $H_2S$ from petroleum or natural gas is only one example of where $H_2S$ level reduction or removal must be performed. Many aqueous substrates also must be treated to reduce or remove $H_2S$.

In the manufactured gas industry, or the coke-making industry, the destructive distillation of bituminous coal with a high sulfur content commonly produces coal gas containing an unacceptable amount of $H_2S$. Another $H_2S$ contamination problem arises during the manufacture of water gas or synthesis gas. Water gas or synthesis gas streams that contain $H_2S$ often are produced by passing steam over a bed of incandescent coke or coal. The incandescent coke or coal often contains a minor amount of sulfur, which contaminates the resulting gas stream.

The problem of removing or reducing $H_2S$ from hydrocarbon and aqueous substrates has been solved in many different ways in the past. Most of the known techniques involve either (a) absorption, or selective absorption by a suitable absorbent, after which the absorbent is separated and the sulfur removed to regenerate and recycle the absorbent, or (b) selective reaction with a reagent that produces a readily soluble product. A number of known systems treat a hydrocarbon stream with an amine, an aldehyde, an alcohol, and/or a reaction product thereof. The wide variety of processes, patents, and publications that describe methods for removing $H_2S$ from hydrocarbon streams is evidence that it is desirable and necessary to remove $H_2S$ from aqueous and hydrocarbon streams.

A continuing need exists for alternative processes and compositions to reduce and/or remove $H_2S$ from aqueous and hydrocarbon substrates.

SUMMARY OF THE INVENTION

The present invention provides a method for scavenging $H_2S$ from aqueous and hydrocarbon substrates using an epoxide. Preferred epoxides are styrene oxide, 1,3-butadiene diepoxide, and cyclohexene oxide.

DETAILED DESCRIPTION OF THE INVENTION

The scavenging agents of the present invention may be used to treat aqueous and hydrocarbon substrates that are rendered "sour" by the presence of "sulfhydryl compounds," such as hydrogen sulfide ($H_2S$), organosulfur compounds having a sulfhydryl (—SH) group, known as mercaptans, also known as thiols (R—SH, where R is a hydrocarbon group), thiol carboxylic acids (RCO—SH), dithio acids (RCS—SH), and related compounds.

The scavenging agents of the present invention may be used to treat a wide variety of aqueous and hydrocarbon substrates, and are especially useful to treat fuel oils. The treatment may take place at temperatures up to the temperature at which the material being treated begins to decompose. Preferred treatment temperatures are between ambient to about 232° C. (450° F.).

As used in this application, the term "aqueous substrate" refers to any "sour" aqueous substrate, including waste water streams in transit to or from, or contained in a municipal or other waste treatment facility, a tanning facility, a paper making facility, or a food processing facility.

The term "hydrocarbon substrate" is meant to include unrefined and refined hydrocarbon products, including natural gas, derived from petroleum or from the liquefaction of coal, both of which contain hydrogen sulfide or other sulfur-containing compounds. Thus, particularly for petroleum-based fuels, the term "hydrocarbon substrate" includes wellhead condensate as well as crude oil which may be contained in storage facilities at the producing field. "Hydrocarbon substrate" also includes the same materials transported from those facilities by barges, pipelines, tankers, or trucks to refinery storage tanks, or, alternately, transported directly from the producing facilities through pipelines to the refinery storage tanks. The term "hydrocarbon substrate" also includes refined products, interim and final, produced in a refinery, including distillates such as gasolines, distillate fuels, oils, and residual fuels. As used in the claims, the term "hydrocarbon substrate" also refers to vapors produced by the foregoing materials.

The scavenging agents of the present invention are epoxides. Without limiting the invention to any particular theory, the epoxide portion of the molecule is believed to react with the sulfhydryl compounds according to the following formula:

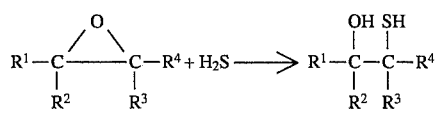

Any epoxide should function in the present invention as long as the remainder of the compound does not interfere with this reaction.

Epoxides suitable for use in the present invention generally have the formula:

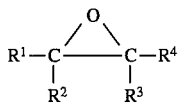

wherein $R^1$, $R^2$, $R^3$, and $R^4$ independently are selected from the group consisting of hydrogen and hydrocarbon groups having between about 1–20 carbon atoms, selected from the group consisting of straight, branched, and cyclic alkyl groups, aryl, alkaryl, and aralkyl groups, and heterocyclic alkyls containing oxygen as a ring constituent, wherein $R^2$ and $R^3$ may be joined to form a cycloalkyl or a heterocyclic alkyl having oxygen as a ring constituent. Preferred embodiments are: (a) styrene oxide, wherein $R^1$ is a phenyl group and $R^2$, $R^3$, and $R^4$ are hydrogen; (b) cyclohexene oxide, wherein $R^1$ and $R^4$ are hydrogen, and $R^2$ and $R^3$ are joined with the carbons in the epoxide to form an epoxy cyclohexane; and, (c) 1,3-butadiene diepoxide, wherein $R^1$, $R^2$, and $R^3$ are hydrogen and $R^4$ is an ethylene oxide group.

The epoxide portion of the molecule is believed to be the functional group that actually reacts with the sulfur moiety; therefore, molecules in which the epoxide group is more "accessible" to the sulfur in the substrate should be more efficient scavengers. Epoxides of certain vegetable oils, namely linseed oil and soybean oil, functioned to scavenge sulfur containing compounds from residual fuel oil, but were less efficient scavengers than the other epoxide candidates.

Epoxides suitable for use in the present invention are commercially available from a number of sources. For example, cyclohexene oxide may be obtained from BASF Corporation or Uniroyal Chemical Co., and 1,3-butadiene diepoxide is available in smaller quantities from Aldrich Chemical Co. Styrene oxide is commercially available from Rhone-Poulenc, Shelton, Conn. Epoxides also may be readily prepared using well established procedures, such as those described in Morrison and Boyd, *ORGANIC CHEMISTRY* (5th Ed. 1987) pp. 713–715, incorporated herein by reference.

The aqueous or hydrocarbon substrate should be treated with between about 10–2000 ppm, preferably between about 50–500 ppm of epoxide. The epoxide preferably should be added to the substrate at high enough temperatures that the material is at least flowable for ease in mixing.

The hydrocarbon or aqueous substrate should be treated with the scavenging agent until reaction with hydrogen sulfide, or with other sulfhydryl compounds, has produced a product in which the sulfhydryls in the vapor (or liquid) phase have been removed to an acceptable or specification grade product. Typically, a sufficient amount of epoxide should be added to reduce the sulfhydryls in the vapor phase to at least about 200 ppm or less.

Where the substrate is a hydrocarbon, the amount of $H_2S$ in the vapor phase above the hydrocarbon may be measured. The epoxide may be added to the hydrocarbon in an amount equal to about 1 ppm by weight of scavenger per 10 ppm by volume of $H_2S$ concentration in the vapor phase. Alternately, the total concentration of hydrogen sulfide in the system can be measured, and a stoichiometric amount of scavenger should be added. The molar amount of epoxide added as a scavenger should be proportional to the molar amount of sulfhydryl compound(s) present in the substrate.

The reaction proceeds more quickly at elevated temperatures, and the reaction mixture may have a temperature of up to about 232° C. (450° F.) without significant loss of epoxide activity. Hydrogen sulfide contents of up to about 100,000 ppm in the vapor phase may be treated satisfactorily with the epoxides of the present invention. The epoxides will be most effective if the substrate is at temperatures between ambient to about 232° C. (450° F.), preferably between about 60° C. (140° F.) to about 82° C. (180° F.).

The invention will be better understood with reference to the following examples:

EXAMPLE 1

Septum bottles were half filled with hydrogen sulfide laden residual fuel oil (#6 oil) and the head spaces were blanketed with nitrogen. The bottles were septum sealed and placed in an oven at 60° C. (140° F.). After 18 hours, samples were shaken and the head spaces were analyzed for hydrogen sulfide by withdrawing a known volume from the head space with a gas-tight syringe. The sample (or a dilution of the sample in air) was injected into a gas chromatograph (GC) and the area counts of hydrogen sulfide measured. The results are shown under the heading "Initial Reading" in Table I.

300 μL of styrene oxide obtained from Aldrich Chemical Co. was injected into one of the sample bottles. The other, control bottle was a designated blank (i.e., untreated). The bottles were shaken vigorously for 30 seconds, and placed in an oven at 60° C. (140° F.). The bottles were shaken periodically, and samples of the head space vapor were withdrawn using a μL syringe at various intervals and analyzed by gas chromatography.

The hydrogen sulfide content of the head space in the samples and the control were calculated by comparing the area counts with a standard curve for hydrogen sulfide. The results are shown in Table I:

TABLE I

| TIME OF READING | $H_2S$ CONCENTRATION IN BLANK | $H_2S$ CONCENTRATION IN STYRENE OXIDE |
|---|---|---|
| INITIAL READING (before injection with sample) | 97,100 | 80,700 |
| 1 HOUR AFTER INJECTION | 101,000 | 39,900 |
| 4 HOURS AFTER INJECTION | 96,600 | 1,560 |
| 66 HOURS AFTER INJECTION | 90,000 | 421 |
| 90 HOURS AFTER INJECTION | 88,300 | 251 |
| 96 HOURS AFTER INJECTION | 109,000 | 443 |
| 114 HOURS AFTER INJECTION | 102,000 | 304 |
| 138 HOURS AFTER INJECTION | 101,000 | 482 |

The efficacy of the styrene oxide may be expressed as the treatment effectiveness ratio ("TER"). The TER is defined as $$\frac{PPM_v \text{ of } H_2S \text{ abated}}{PPM_w \text{ of Candidate added}}$$

The higher the value of "T.E.R.," the greater the efficacy. The TER of the styrene oxide used in this experiment was 16.8.

EXAMPLE 2

The sample bottles from Example 1 were placed in an oven at 121° C. (250° F.) and stored to determine how much of the scavenged hydrogen sulfide is released upon heating to a higher temperature. The results are shown in Table II:

TABLE II

| TIME OF READING | $H_2S$ CONCENTRATION IN BLANK (ppm$_w$) | $H_2S$ CONCENTRATION IN THE STYRENE OXIDE TREATED SAMPLE (ppm$_v$) |
| --- | --- | --- |
| 3 HOURS AFTER STORAGE | 137,000 | 3220 |
| 22 HOURS AFTER STORAGE | 108,000 | 11,700 |

Although some hydrogen sulfide was released into the atmosphere at 121° C. (250° F.), over 85% of the initial amount of hydrogen sulfide remained abated.

EXAMPLE 3

Septum bottles were half filled with hydrogen sulfide laden #6 oil and the head spaces were blanketed with nitrogen. The bottles were septum sealed and placed in an oven at 60° C. (140° F.). After 20 hours, the samples were shaken and the head spaces were analyzed for hydrogen sulfide by withdrawing a known volume from the head space with a gas-tight syringe. The sample (or a dilution of the sample in air) was injected into a gas chromatograph (GC) and the area counts of hydrogen sulfide measured. The results are shown under the heading "Initial Reading" in Table III.

300 μL of 98% cyclohexene oxide obtained from Aldrich Chemical Co. was injected into one of the sample bottles. The other, untreated control bottle was designated as a blank. The bottles were shaken vigorously for 30 seconds, and placed in an oven at 60° C. (140° F.). The bottles were shaken periodically, and samples of the head space vapor were withdrawn using a μL syringe at various intervals and analyzed by gas chromatography.

The hydrogen sulfide content of the head space in the samples and the control were calculated by comparing the area counts with a standard curve for hydrogen sulfide. The results are shown in Table III:

TABLE III

| TIME OF READING | $H_2S$ CONCENTRATION IN BLANK (ppm$_v$) | $H_2S$ CONCENTRATION IN THE CYCLOHEXENE OXIDE TREATED SAMPLE (ppm$_v$) |
| --- | --- | --- |
| INITIAL READING (before injection with sample) | 133,000 | 129,000 |
| 1 HOUR AFTER INJECTION | 138,000 | 108,000 |
| 20.5 HOURS AFTER INJECTION | 134,000 | 227 |
| 25.5–26 HOURS AFTER INJECTION | 134,000 | 147 |
| 43–44 HOURS AFTER INJECTION | 130,000 | 8 |
| 108.5–112.5 HOURS AFTER INJECTION | 131,000 | 0 |

EXAMPLE 4

The sample bottles from Example 3 were placed in an oven at 121° C. (250° F.) and stored to determine how much of the abated hydrogen sulfide was released. The results are shown in Table IV:

TABLE IV

| TIME OF READING | $H_2S$ CONCENTRATION IN BLANK | $H_2S$ CONCENTRATION IN THE CYCLOHEXENE OXIDE TREATED SAMPLE (ppm$_v$) |
| --- | --- | --- |
| 17 HOURS AFTER STORAGE | 150,000 | 41.3 |

The foregoing results show that cyclohexene oxide is an excellent hydrogen sulfide scavenger, scavenging 100% of the hydrogen sulfide in the sample. Cyclohexene oxide did not release a significant amount of hydrogen sulfide after storage at high temperatures. Styrene oxide also tested extremely well, abating over 99% of the hydrogen sulfide in the sample. Styrene oxide released somewhat more of hydrogen sulfide than the cyclohexene oxide at high temperatures; however, both compounds exhibited a high level of retention of the scavenged hydrogen sulfide.

EXAMPLE 5

Septum bottles were half filled with hydrogen sulfide laden #6 oil and the head spaces were blanketed with nitrogen. The bottles were septum sealed and placed in an oven at 60° C. (140° F.). After 20.5 hours, the samples were shaken and the head spaces were analyzed for hydrogen sulfide by withdrawing a known volume from the head space with a gas-tight syringe. The sample (or a dilution of the sample in air) was injected into a gas chromatograph (GC) and the area counts of hydrogen sulfide measured. The results are shown under the heading "Initial [$H_2S$]" in Table V.

5,500 ppm of 1,3-butadiene diepoxide obtained from Aldrich Chemical Co. was injected into one of the sample bottles. The control bottles were treated with the amount of $H_2S$ scavenging product shown in the Table V.

A number of test agents are listed in the Table V and later Tables simply by the letters "A, B, C, D," or "E." These letters refer to other commercially available hydrogen sulfide abatement products which were used only as a reference to compare the efficacy of the scavenging agents of the present invention.

After adding the scavenging agent, the bottles were shaken vigorously for 30 seconds, and placed in an oven at 60° C. (140° F.). The bottles were shaken periodically, and samples of the head space vapor were withdrawn using a μL syringe at various intervals and analyzed by gas chromatography.

The hydrogen sulfide content of the head space in the samples and the controls were calculated by comparing the area counts with a standard curve for hydrogen sulfide. The results are shown in Table V:

TABLE V

| ADDITIVE | INITIAL [H$_2$S] (ppm$_v$) | FINAL [H$_2$S] (ppm$_v$) | FINAL ADDITIVE DOSAGE (ppm$_w$) | TER | PERCENT H$_2$S ABATED |
|---|---|---|---|---|---|
| BLANK | 39,500 | 29,800 | — | — | — |
| A | 41,100 | 1,060 | 5,500 | 7.29 | 97.4% |
| A | 42,500 | 1,150 | 5,500 | 7.52 | 97.3% |
| B | 39,000 | 0 | 4,000 | 9.75 | 100.0% |
| 1,3-BUTADIENE DIEPOXIDE | 40,200 | 0 | 5,500 | 7.31 | 100.0% |

The foregoing results show that 1,3-butadiene diepoxide is an excellent hydrogen sulfide scavenger, scavenging 100% of the hydrogen sulfide in the sample.

EXAMPLE 6

The sample bottles from Example 5 were placed in an oven at 121° C. (250° F.) and stored to determine whether the hydrogen sulfide was re-released by the epoxide. The results are shown in Table VI:

TABLE VI

| ADDITIVE | PERCENT H$_2$S RE-RELEASED |
|---|---|
| A | 39.7% |
| A | 51.3% |
| B | 23.8% |
| 1,3-butadiene diepoxide | 1.3% |

The 1,3-butadiene diepoxide did not release a significant amount of hydrogen sulfide after storage at high temperatures.

EXAMPLE 7

The procedures of Examples 6 and 7 were repeated with a different batch of residual fuel (#6) oil. The results are given in Table VII:

TABLE VII

| ADDITIVE | INITIAL [H$_2$S] (ppm$_v$) | FINAL [H$_2$S] (ppm$_v$) | FINAL ADDITIVE DOSAGE (ppm$_w$) | TER | PERCENT H$_2$S ABATED | PERCENT H$_2$S RELEASED AT 121° C. (250° F.) |
|---|---|---|---|---|---|---|
| BLANK | 8,900 | 6,300 | — | — | — | — |
| B | 9,650 | 1,470 | 1,300 | 6.29 | 84.8% | 50.0% |
| 1,3-butadiene diepoxide | 11,300 | 464 | 1,300 | 8.32 | 95.9% | −4.1% |

This experiment also demonstrated that 1,3-butadiene diepoxide is an effective hydrogen sulfide scavenger that will not release a significant amount of hydrogen sulfide after storage at high temperatures.

EXAMPLE 8

The procedures of Examples 6 and 7 were repeated with a different batch of residual fuel (#6) oil. The results are given in Table VIII:

TABLE VIII

| ADDITIVE | INITIAL [H₂S] (ppmᵥ) | FINAL [H₂S] (ppmᵥ) | FINAL ADDITIVE DOSAGE (ppm_w) | TER | PERCENT H₂S ABATED | PERCENT H₂S RELEASED AT 121° C. (250° F.) |
|---|---|---|---|---|---|---|
| BLANK | 9,190 | 9,120 | — | — | — | — |
| C | 10,900 | 1,500 | 1,000 | 9.43 | 86.7% | 55.3% |
| D | 8,950 | 238 | 1,000 | 8.72 | 97.3% | 23.8% |
| 1,3-butadiene diepoxide | 9,970 | 1,680 | 1,130 | 7.37 | 83.2% | −17.7% |

Once again, 1,3-butadiene diepoxide tested very well as a hydrogen sulfide scavenger, with no release of hydrogen sulfide after storage at a high temperature. In fact, additional H₂S abatement occurred at higher temperature, as evidenced by the negative value for % H₂S released.

EXAMPLE 9

The procedures of Examples 6 and 7 were repeated with a different batch of residual fuel (#6) oil. The hydrogen sulfide content of the oil used in this experiment was lower than the level in the oils used in other experiments to determine if there was any difference in treatment results. The results are given in Table IX:

TABLE IX

| ADDITIVE | INITIAL [H₂S] (ppmᵥ) | FINAL [H₂S] (ppmᵥ) | FINAL ADDITIVE DOSAGE (ppm_w) | TER |
|---|---|---|---|---|
| BLANK | 7,570 | 5,160 | — | — |
| B | 6,250 | 1,300 | 1,000 | 4.9 |
| C | 6,250 | 1,390 | 1,000 | 4.9 |
| D | 5,040 | 139 | 600 | 8.2 |
| STYRENE OXIDE (50% FAS-150)* | 5,730 | 5,330 | 1,000 | 0.8 |
| Cyclohexene Oxide (51% FAS-150)* | 6,510 | 4,990 | 1,000 | 3.0 |

*"FAS-150" is a heavy aromatic naphtha sold by Fina Oil & Chemical Co., Dallas, Texas.

The foregoing results indicate that styrene oxide and cyclohexene oxide may be less effective in treating oils with lower hydrogen sulfide concentrations.

EXAMPLE 10

Example 9 was repeated using oil with increased hydrogen sulfide levels. The results are given in Table X:

TABLE X

| ADDITIVE | INITIAL [H₂S] (ppmᵥ) | FINAL [H₂S] (ppmᵥ) | FINAL ADDITIVE DOSAGE (ppm_w) | TER |
|---|---|---|---|---|
| BLANK | 48,000 | 33,600 | — | — |
| B | 41,500 | 2,110 | 3,000 | 13.1 |
| C | 42,200 | 2,110 | 4,000 | 10.0 |
| D | 43,700 | 2,200 | 2,000 | 20.7 |
| STYRENE OXIDE (50% FAS-150) | 38,800 | 23,400 | 4,000 | 7.8 |
| Cyclohexene Oxide (51% FAS-150) | 38,500 | 29,100 | 4,000 | 4.6 |

The performance levels of the styrene oxide and the cyclohexene oxide were much lower than expected; however, this result was believed to be due to inadequate mixing of these two samples.

EXAMPLE 11

Cyclohexene oxide was retested using the same procedures as those given in Examples 6 and 7. The cyclohexene oxide (9500 ppm_w) reduced an initial H₂S concentration of 129,000 to 0, resulting in a treatment effectiveness ratio of 13.6. None of the abated H₂S was released after storage at 121° C. (250° F.) for 17 hours.

EXAMPLE 12

The procedures of Examples 6 and 7 were repeated. The results are shown in Table XI:

TABLE XI

| ADDITIVE | INITIAL [H₂S] (ppmᵥ) | FINAL TREATMENT [H₂S] (ppmᵥ) | FINAL ADDITIVE DOSAGE (ppm_w) | TER |
|---|---|---|---|---|
| BLANK | 100,000 | 90,000 | — | — |
| Styrene Oxide | 80,700 | 482 | 7300 | 11.0 |
| E | 55,600 | 36 | 5300 | 10.5 |

After 22 hours, the styrene oxide released only 9.6% of the abated H₂S, an amount which is not considered to be significant.

The foregoing results indicate that 1,3-butadiene diepoxide, styrene oxide, and cyclohexene oxide are excellent hydrogen sulfide scavengers that do not release a significant amount of hydrogen sulfide after storage at 121° C. (250° F.). Where the substrate is a hydrocarbon, thorough mixing of the substrate and the epoxide is important for maximum efficiency.

Persons of skill in the art will appreciate that many modifications may be made to the embodiments described herein without departing from the spirit of the present invention. Accordingly, the embodiments described herein are illustrative only and are not intended to limit the scope of the present invention.

I claim:

1. A method for scavenging sulfhydryl compounds from sour aqueous and hydrocarbon substrates comprising thoroughly mixing said substrate with an effective amount of a scavenging agent comprising an epoxide wherein said epoxide is a liquid at ambient temperature and is not ethylene oxide.

2. A method for scavenging sulfhydryl compounds from sour aqueous and hydrocarbon substrates comprising thoroughly mixing said sulfhydryl compounds with an effective amount of an epoxide comprising the following structure:

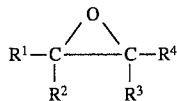

wherein $R^1$, $R^2$, $R^3$, and $R^4$ independently are selected from the group consisting of hydrogen and hydrocarbon groups having between about 1–20 carbon atoms, selected from the group consisting of straight, branched, and cyclic alkyl groups, aryl, alkaryl, and aralkyl groups, and heterocyclic alkyls containing oxygen as a ring constituent, wherein $R^2$ and $R^3$ may be joined to form a cycloalkyl or a heterocyclic alkyl having oxygen as a ring constituent wherein said epoxide is a liquid at ambient temperature and is not ethylene oxide.

3. The method of claim 1 wherein said epoxide is styrene oxide.

4. The method of claim 1 wherein said epoxide is 1,3-butadiene diepoxide.

5. The method of claim 1 wherein said epoxide is cyclohexene oxide.

6. The method of claim 1 wherein said substrate is treated at a temperature of between ambient to about 232° C. (450° F.).

7. The method of claim 2 wherein said substrate is treated at a temperature of between ambient to about 232° C. (450° F.).

8. The method of claim 3 wherein said substrate is treated at a temperature of between ambient to about 232° C. (450° F.).

9. The method of claim 4 wherein said substrate is treated at a temperature of between ambient to about 232° C. (450° F.).

10. The method of claim 5 wherein said substrate is treated at a temperature of between ambient to about 232° C. (450° F.).

11. The method of claim 1 wherein said substrate has a vapor phase and a liquid phase, and wherein said effective amount of said epoxide is substantially equal to about 1 ppm by weight of said epoxide per about 10 ppm by volume of hydrogen sulfide in said vapor phase.

12. The method of claim 2 wherein said substrate has a vapor phase and a liquid phase, and wherein said effective amount of said epoxide is substantially equal to about 1 ppm by weight of said epoxide per about 10 ppm by volume of hydrogen sulfide in the vapor phase.

13. The method of claim 3 wherein said substrate has a vapor phase and a liquid phase, and wherein said effective amount of said epoxide is substantially equal to about 1 ppm by weight of said epoxide per about 10 ppm by volume of hydrogen sulfide in said vapor phase.

14. The method of claim 4 wherein said substrate has a vapor phase and a liquid phase, and wherein said effective amount of said epoxide is substantially equal to about 1 ppm by weight of said epoxide per about 10 ppm by volume of hydrogen sulfide in said vapor phase.

15. The method of claim 5 wherein said substrate has a vapor phase and a liquid phase, and wherein said effective amount of said epoxide is substantially equal to about 1 ppm by weight of said epoxide per about 10 ppm by volume of hydrogen sulfide in said vapor phase.

16. The method of claim 11 wherein said substrate comprises a molar amount of hydrogen sulfide in both said vapor phase and said liquid phase; and said effective amount of said epoxide is substantially equal to said molar amount of said hydrogen sulfide.

17. The method of claim 12 wherein said substrate comprises a molar amount of hydrogen sulfide in both said vapor phase and said liquid phase; and said effective amount of said epoxide is substantially equal to said molar amount of said hydrogen sulfide.

18. The method of claim 13 wherein said substrate comprises a molar amount of hydrogen sulfide in both said vapor phase and said liquid phase; and said effective amount of said epoxide is substantially equal to said molar amount of said hydrogen sulfide.

19. The method of claim 14 wherein said substrate comprises a molar amount of hydrogen sulfide in both said vapor phase and said liquid phase; and said effective amount of said epoxide is substantially equal to said molar amount of said hydrogen sulfide.

20. The method of claim 15 wherein said substrate comprises a molar amount of hydrogen sulfide in both said vapor phase and said liquid phase; and said effective amount of said epoxide is substantially equal to said molar amount of said hydrogen sulfide.

21. A method for scavenging sulfhydryl compounds from sour aqueous and hydrocarbon substrates comprising thoroughly mixing said sulfhydryl compounds with an effective amount of a scavenging agent at a temperature between ambient to about 232° C. (450° F.), wherein said scavenging agent is selected from the group consisting of styrene oxide, 1,3-butadiene diepoxide, and cyclohexene oxide.

22. Aqueous and hydrocarbon substrates treated to scavenge sulfhydryl compounds by thoroughly mixing said sulfhydryl compounds with an effective amount of an epoxide wherein said epoxide is a liquid at ambient temperature and is not ethylene oxide.

* * * * *